United States Patent [19]

Klabacka et al.

[11] 4,229,334

[45] Oct. 21, 1980

[54] PLASTIC MODIFIED WRITING COMPOSITIONS

[75] Inventors: Bedřich Klabacka; Josef Polanský; Josef Hynek, all of Ceske Budejovice, Czechoslovakia

[73] Assignee: Koh-i-noor Hardtmuth, oborovy podnik, Czechoslovakia

[21] Appl. No.: 971,112

[22] Filed: Dec. 19, 1978

[30] Foreign Application Priority Data

Dec. 22, 1977 [CS] Czechoslovakia ............... 8718-77

[51] Int. Cl.$^3$ .................. C08L 23/06; C09D 13/00; C09D 5/06

[52] U.S. Cl. .................. 260/28.5 A; 260/23 H; 106/19

[58] Field of Search ................ 260/23 H, 28.5 A; 106/19

[56] References Cited

U.S. PATENT DOCUMENTS

| 3,409,574 | 11/1968 | Gros | 260/23 |
|---|---|---|---|
| 3,772,233 | 11/1973 | Gaab et al. | 260/28.5 A |
| 3,933,708 | 1/1976 | Brinkman | 260/23 H |

Primary Examiner—Earl A. Nielsen

[57] ABSTRACT

A plastic modified writing or inscribing composition obtained by incorporating plastics of different solvent solubility in the composition is prepared. When applied to a suitable surface, spreading of the composition is accomplished by subsequent solvent treatment.

4 Claims, No Drawings

PLASTIC MODIFIED WRITING COMPOSITIONS

BACKGROUND OF THE INVENTION

This invention relates to the preparation of a plastic modified inscribing writing, or drawing composition which when applied to a suitable surface may subsequently be spread by means of water or other solvents.

Various writing or inscribing compositions are known in the art, for example wax and oil pastels, which have been employed for many years. Such wax and oil pastels have been manufactured by extruding or casting into appropriate shapes a composition containing color pigments, filler, and different waxes. Classical writing implements are also known, sometimes being called "Progresses" and being understood to be a core of writing composition such as those aforementioned and having a thin protecting coat thereon. Classical Progresses have been prepared by forming compositions of color pigments, fillers, and bonding agents soluble in water, such compositions being homogenized in suitable equipment as for example kneading mills and subsequently formed into the desired shape by extrusion, compression, and related techniques. Such shaped compositions have been treated after drying by impregnation in a molten composition of waxes and may have been further wetted in different lacquers in order to modify the surface characteristics, thereof.

In contrast to the compositions of the instant invention, however, the prior art compositions could not successfully be employed in such manner that permitted spreading of the tracing or drawing by means of solvents, particularly by means of water. The term "spreading", as used herein means the characteristic ability to extend or diffuse the tracing of the composition, subsequent to applying same to a surface, beyond the original configuration of the tracing. Spreading can be achieved by means of a brush, a sponge or the like using a suitable solvent such as water or various organic solvents. When applied to substrates or surfaces such as paper, parchment, wood, fabric the tracing composition may be expanded to produce a larger color area or to obtain color changes and shading by diffusing one color into another. When the instant compositions are applied to glass-like or plastic substrates, various organic solvents may be utilized which, in addition to spreading the tracing, may also otherwise spread or diffuse the plastic substrate, often resulting in further pleasing color relationships.

SUMMARY OF THE INVENTION

It is an object of this invention to provide a plastic modified writing composition which when subsequently shaped to a desired configuration, is useful for writing or inscribing characters on surfaces, the tracings so inscribed being amenable to a subsequent spreading action by means of water or other solvents, as for example ethyl alcohol, benzyl alcohol, xylene, chloroform, acetone, glycerine and the like.

Broadly, the compositions of this invention are obtained by admixing a polymer insoluble in water, a polymer having good water solubility, various waxes, color pigments, and various fillers such as kaolin, chalk, talcum, and the like. More specifically, the composition comprises an admixture of between about 0.5-60 parts of polyethylene, about 0.5-80 parts of polyethyleneglycol or other non-ionic synthetic water soluble waxes or nonionic ethylene oxide adducts of higher fatty acids, between from about 1-about 40 parts of waxes, between from about 1-30 parts of color pigments, and between from about 0.5-50 parts of fillers of the aforementioned type. The term "parts" as used herein represents that portion of the individual component as is present on a weight basis in the total composition.

An advantage of the compositions of this invention is that the trace of the composition when inscribed on a suitable surface can be later spread by the application of a suitable solvent such as water. This phenomenon is attained by employing a combination of 2 or more thermoplastic components, capable of being mixed, and being characterized by the insolubility of one of the thermoplastic components in water and the excellent solubility of the other component in water.

The instant compositions in an appropriate solid form, such as a crayon having varying degrees of hardness are applied to a surface to form a trace thereon. Subsequently, the trace is spread by employing solvents and techniques as hereinbefore mentioned.

Broadly, the instant compositions are prepared by heating the thermoplastic components to a temperature sufficient to melt or at least significantly soften the components and adding the nonfusible components to the melted or softened thermoplastic admixture. The resulting composition may then be homogenized, employing grinding techniques such as are known in the art and further shaped into writing implements using injection, compression, and other forming techniques normally carried out at slightly elevated temperatures.

The following examples are submitted in order to demonstrate the preparation of compositions according to the instant invention. These are illustrative only and various modifications, both with respect to the constituents, their ranges, and the method of treatment may be made as will be apparent to those familiar with this art.

EXAMPLE 1

A writing composition was prepared by incorporating the following materials as hereinafter described.

| MATERIAL | PARTS BY WEIGHT |
| --- | --- |
| High Pressure Polyethylene | 35 |
| Paraffin (M.P. 56-57° C.) | 10 |
| Bleached Bee's Wax | 18 |
| Calcium Stearate | 2 |
| Polyethylene glycol | 15 |
| Kaolin | 4 |
| Titanium Oxide | 6 |
| Color Index Pigment red No. 4-12085 | 10 |

The thermoplastic materials were admixed in a vessel maintained at a temperature of almost 100° C. Upon softening or melting a fluid mass was obtained, and the other components were then introduced. The resultant fluidized mixture was then homogenized by stirring the mass in the vessel, transferred to a three roller rolling mill and further subjected to pressure rolling to effect crushing of the solid fractions to particles having extremely small gain size. The homogeneous admixture was then, by means of injection or extrusion procedures shaped into writing implements, such as in the form of crayons or the like. When subsequently employed to inscribe characters on a suitable surface such as paper, parchment, or canvas, the resulting composition tracing was easily further spread on the surface by applying a solvent to the surface.

EXAMPLE 2

A second writing or inscribing composition was prepared by using the following composition of materials:

| MATERIALS | PARTS BY WEIGHT |
| --- | --- |
| High Pressure Polyethylene | 0.5 |
| Polyethyleneglycol (mol.wt. 6000) | 45 |
| Calcium Stearate | 2 |
| Paraffin | 1.5 |
| Titanium Oxide | 6 |
| Kaolin | 35 |
| Color Index Pigment yellow No. 3-11 710 | 10 |

These materials were initially homogenized in a drum mixer operating at ambient temperatures. The resulting mass was introduced by means of a spiral conveyor into a hopper of a press machine and further ground and homogenized by being passed through a worm screw. The homogeneous composition was again formed into suitable shapes by injection or extrusion techniques. The elevation in temperature resulting from the working of the materials as aforementioned was sufficient to soften the thermoplastic constituents and permit complete incorporation of same in the final composition. The so produced writing composition was utilized as in Example 1 to form tracings on a substrate surface, the tracing being easily spreadable by sponging with water.

EXAMPLES 3 and 4

Other compositions according to this invention were prepared by using the following materials:

| MATERIALS | PARTS BY WEIGHT |
| --- | --- |
| High Pressure Polyethylene | 30 |
| Polyethyleneglycol (mol.wt. 1000) | 10 |
| Bleached Bee's Wax | 20 |
| Calcium Stearate | 2 |
| (non-ionic) "Apretar" | 10 |
| Color Index Pigment Blue No.15 (alpha form) 74160 | 10 |
| Titanium Oxide | 8 |
| Kaolin | 10 |

These materials were incorporated into a homogeneous writing compositions by techniques similar to those described in each of the previous examples and utilized in the same manner with comparable results, i.e. ease of spreadability when treated with suitable solvents. In this case some fractions of the subsequently applied tracings were spread by the application of water and other fractions through organic solvent utilization.

Additional examples, numbers 5 and 6 are submitted to further illustrate this invention including ranges of constituents, particularly with respect to the polymers, as are useful in actual practice.

EXAMPLE 5

| MATERIALS | PARTS BY WEIGHT |
| --- | --- |
| Polyethylene | 0.5 |
| Polyethyleneglycol | 80.0 |
| Paraffin | 1.0 |
| Titanium oxide | 4.5 |
| Kaolin | 4.0 |
| Color Index Pigment violet No. 39-45 555:2 | 10.0 |

The manufacturing technology was similar to that as employed in examples 1 and 2. The trace of this composition was easily spread by water.

EXAMPLE 6

| MATERIALS | PARTS BY WEIGHT |
| --- | --- |
| Polyethylene | 60.0 |
| Polyethyleneglycol | 0.5 |
| Paraffin | 3.0 |
| Bee's wax | 10.5 |
| Kaolin | 2.0 |
| Titanium oxide | 8.0 |
| Softener/type Edenol BS-20N, manufactured by Henkel in Western Germany/ | 5.0 |
| Color Index Pigment Green No.1-42 040:1 | 10.0 |

The manufacturing technology was similar to that employed in examples 1 and 2.

In accordance with the instant invention, and as described in the foregoing examples, incorporation of polyethylene is particularly useful in the practice of the invention. While serving as an excellent thermoplastic material, it has the added advantage of softening at temperatures approximating or even below the boiling point of water. The polyethyleneglycol and related materials, representing the water miscible or water solvent thermoplastic compositions are compatible with and easily mixed with the polyethylene at such temperatures.

Typical coloring pigments in addition to those shown in the examples as may be employed include color index pigment yellow No. 1-11 680, color index pigment blue No. 15 (beta form)-74 160, color index pigment orange No. 5-12 078, color index pigment orange No. 5-21 110, color index pigment black No. 11-77 499, color index pigment black No. 7-77 226 and color index pigment white No. 6-77 871.

The thermoplastic components which are insoluble and those which are soluble are selected so that after softening or melting a homogeneous mixture is achieved. The mixing is of a physical nature and no chemical reactions between the constituents occurs. The resulting mass has properties as are determined according to the kinds and amounts of the major components of the mixture. If for instance there is a larger content of a component which can be spread by water, the resulting implement can be easily spread by water. The opposite situation prevails if the major component is insoluble in water.

The ratio of thermoplastic components with different affinity to water therefore establishes the degree of the ultimate spreading property of a particular composition. The thermoplastic components used in formulating the products influence the final product solely by their physical properties.

Nonionic synthetic waxes or nonionic ethyleneoxide adducts of higher fatty acids are components which are utilized for manufacture of different industrial products with wetting properties, wherein their utility is observed by the presence of water, i.e. these products are readily soluble in water. According to this invention these components fulfill the function of a thermoplastic component which is soluble in water. They simultaneously improve the spreadability of the trace in that they also aid in the water dispersion of water insoluble particles of pigments, fillers and polyethylene.

The non-fusible components should be of fine particle size initially or should be capable of being ground by the techniques described herein to between about five and sixty microns. Small grain sizes of a diameter of between about 3 to 5 mm. are suitable for us in injection molding equipment.

While specific embodiments of the invention have been shown and described in detail to illustrate the application and the principles of the invention, it will be understood that the invention may be embodied otherwise without departing from such principles.

What is claimed:

1. Inscribing composition comprising a solid homogeneous mixture of:
   a. Polyethylene, and
   b. A water miscible component selected from the group consisting of polyethyleneglycol, nonionic water soluble waxes, nonionic ethylene adducts of higher fatty acids, and mixtures thereof, and
   c. Wax, and
   d. Color Pigment, and
   e. Filler material.

2. Composition according to claim 1, wherein high pressure polyethylene is employed.

3. Composition according to claim 1, wherein the constituents are employed in parts by weight based on the total composition in weight as follows; constituent (a) about 0.5 to 60 parts, constituent (b) about 0.5 to 80 parts constituent (c) about 1 to 40 parts, the parts of color pigment and filler material being between about 1 to 30 and 0.5 to 50, respectively.

4. Method for preparing a solid homogeneous inscribing composition comprising the steps of admixing polyethylene, a water miscible component selected from the group consisting of polyethyleneglycol, nonionic water soluble waxes, nonionic ethylene adducts of higher fatty acids, and mixtures thereof, wax, color pigment, and filler material at temperature conditions sufficient to soften thermoplastic constituents, homogenizing the mixture thus formed, shaping said mixture and hardening said mixture to form a solid composition.

* * * * *